(12) United States Patent
Reznic et al.

(10) Patent No.: US 7,664,184 B2
(45) Date of Patent: Feb. 16, 2010

(54) INTERPOLATION IMAGE COMPRESSION

(75) Inventors: Zvi Reznic, Tel-Aviv (IL); Nathan Elnathan, Raanana (IL)

(73) Assignee: Amimon Ltd., Herzlia (IL)

(*) Notice: Subject to any disclaimer, the term of this patent is extended or adjusted under 35 U.S.C. 154(b) by 23 days.

(21) Appl. No.: 11/186,586

(22) Filed: Jul. 21, 2005

(65) Prior Publication Data

US 2006/0050972 A1 Mar. 9, 2006

Related U.S. Application Data

(63) Continuation-in-part of application No. PCT/IL2004/000779, filed on Aug. 26, 2004.

(60) Provisional application No. 60/590,197, filed on Jul. 21, 2004, provisional application No. 60/667,366, filed on Mar. 31, 2005.

(51) Int. Cl.
*H04N 7/18* (2006.01)

(52) U.S. Cl. .................... 375/240.26; 375/240.29; 375/240.12

(58) Field of Classification Search ................ 375/240.01–240.29
See application file for complete search history.

(56) References Cited

U.S. PATENT DOCUMENTS

| | | | |
|---|---|---|---|
| 5,768,535 A | 6/1998 | Chaddha et al. | |
| 5,801,678 A * | 9/1998 | Huang et al. | 345/667 |
| 5,917,963 A * | 6/1999 | Miyake | 382/300 |
| 6,088,392 A * | 7/2000 | Rosenberg | 375/240.03 |
| 6,205,254 B1 * | 3/2001 | Koshi et al. | 382/239 |
| 6,269,193 B1 | 7/2001 | Young et al. | |
| 6,522,783 B1 * | 2/2003 | Zeng et al. | 382/239 |
| 6,622,145 B2 * | 9/2003 | Kerofsky | 707/101 |
| 6,654,503 B1 | 11/2003 | Sudharsanan | |
| 6,738,494 B1 * | 5/2004 | Savakis et al. | 382/100 |
| 7,388,996 B2 * | 6/2008 | Lainema et al. | 382/260 |
| 7,444,029 B2 * | 10/2008 | Shen et al. | 382/238 |
| 2003/0002582 A1 | 1/2003 | Obrador | |
| 2003/0021485 A1 * | 1/2003 | Raveendran et al. | 382/244 |
| 2004/0071356 A1 | 4/2004 | Sudharsanan et al. | |
| 2004/0184666 A1 * | 9/2004 | Sekiguchi et al. | 382/236 |

OTHER PUBLICATIONS

Weinberger, M.J., et al. "LOCO-I: A Low Complexity, Context-Based, Lossless Image Compression Algorithm", Proceedings of the IEEE Data Compression Conference, Snowbird, Utah, Mar.-Apr. 1996, pp. 140-149.
MIL-STD-188-197A, Oct. 12, 2004.
William F. Schreiber, "Advanced Television Systems for Terrestrial Broadcasting: Some Problems and Some Proposed Solutions", Proceedings of the IEEE, vol. 83, No. 6, Jun. 1995.

(Continued)

*Primary Examiner*—Andy S Rao
(74) *Attorney, Agent, or Firm*—Eitan Mehulal Law Group

(57) ABSTRACT

A method of compressing an image formed of pixels. The method includes providing a pixel of the image, to be encoded, selecting at least two pixels of the image, other than the encoded pixel, defining a straight line including the encoded pixel, to serve as prediction pixels, calculating a prediction value for the encoded pixel using at least the selected pixels, determining a difference between the calculated prediction value and the actual value of the encoded pixel, encoding the determined difference, such that the encoding error is bounded; and repeating for at least 5% of the pixels of the image.

44 Claims, 5 Drawing Sheets

OTHER PUBLICATIONS

U. Mittal and N. Phamdo, "Hybrid digital-analog (HDA) joint source-channel codes for broadcasting and robust communication", IEEE transactions on Information Theory, May 2002.

Z. Reznic and R. Zamir, "On the transmission of Analog Sources over Channels with Unknown SNR", International Symposium on Information Theory, Jul. 2002.

U. Mittal's Ph.D. Thesis from State University of New York at Stony Brook, Aug. 1999, "Broadcasting, robustness and duality in a joint source-channel coding system".

Z. Reznic's Ph.D. Thesis at Tel-Aviv University "Broadcasting analog sources over Gaussian Channels".

* cited by examiner

|   | A | B | C | D | E | F | G | H | I | J | K | L |
|---|---|---|---|---|---|---|---|---|---|---|---|---|
| 1 | A1 | B1 | C1 | D1 | E1 | F1 | G1 | H1 | I1 | J1 | K1 | L1 |
| 2 | A2 | B2 | C2 | D2 | E2 | F2 | G2 | H2 |   |   |   |   |
| 3 | A3 | B3 | C3 | D3 | E3 | F3 | G3 | H3 |   |   |   |   |
| 4 | A4 | B4 | C4 | D4 |   |   |   |   |   |   |   |   |
|   | A5 | B5 | C5 |   |   |   |   |   |   |   |   |   |
|   | A6 | B6 |   |   |   |   |   |   |   |   |   |   |
|   | A7 | B7 |   |   |   |   |   |   |   |   |   |   |
|   | A8 |   |   |   |   |   |   |   |   |   |   |   |
|   | A9 |   |   |   |   |   |   |   |   |   |   |   |
|   | A10 |   |   |   |   |   |   |   |   |   |   |   |
|   | A11 |   |   |   |   |   |   |   |   |   |   |   |
|   | A12 |   |   |   |   |   |   |   |   |   |   |   |

FIG.3

INTERPOLATION IMAGE COMPRESSION

RELATED APPLICATIONS

The present application claims the benefit under 119(e) from U.S. provisional application 60/590,197, filed Jul. 21, 2004, and U.S. provisional application 60/667,366, filed Mar. 31, 2005, the disclosures of which are incorporated herein by reference. The present application is also a continuation in part (CIP) of PCT application IL2004/000779, filed Aug. 26, 2004, published as PCT publication WO2005/029737, and titled: "Wireless Transmission of High Quality Video", the disclosure of which is incorporated herein by reference.

FIELD OF THE INVENTION

The present invention relates generally to compression of images.

BACKGROUND OF THE INVENTION

There exist in the art many compression methods. Some compression methods, such as Lempel-Ziv (LZ), may be used for the processing of any kind of data. Other compression techniques relate to specific types of data. By taking advantage of information known about the specific type of data being compressed, these compression methods achieve better compression ratios, at least on the average.

Image compression methods may be lossless, in which case there is no degradation in image quality or may be lossy in which case the image quality is degraded. One challenge of lossy compression methods is to perform the compression with minimal quality degradation. One class of lossy compression methods includes bounded compression methods, which methods result in an image in which the loss of data of each pixel is bounded.

One of the existing compression methods for images is lossless JPEG 2000, which achieves an average compression ratio of 30-40%. The lossless JPEG-2000 compression method uses a wavelet transform and is therefore complex and requires large memory resources.

The lossless compression low-complexity (LOCO-I) compression method, described for example in Weinberger, M. J., et al., "LOCO-I: A Low Complexity, Context-Based, Lossless Image Compression Algorithm", Proceedings of the IEEE Data Compression Conference, Snowbird, Utah, March-April 1996, pp. 140-149, the disclosure of which is incorporated herein by reference, is a lossless or nearly lossless method of compression. For each pixel, the LOCO-I compression method generates a predictor based on three neighboring pixels. The difference between the actual value of the pixel and the predictor of the pixel is encoded using a Golomb code, which adaptively generates a Huffman code under an assumption that the compressed data is distributed exponentially. Each Golomb code is defined by a pair of parameters, which are the mean of the values and the decay of the values. Different code parameters are used for different contexts, the context differing along the image according to the value of the predictor. In addition, LOCO-I uses run-length to describe a stream of zero-valued predictions. Hardware implementation of the LOCO-I compression method is relatively complex, as a large pipeline is required for tracking the context parameters.

Another image compression method is the adaptive recursive interpolative differential PCM (ARIDPCM), described in MIL-STD-188-197A, Oct. 12, 2004, the disclosure of which is incorporated herein by reference. In the ARIDPCM method, the image is divided into blocks of 8×8 pixels and predictors are generated in recursive interpolation of intermediate values, beginning from the lowest right corner of the block and the values of corner values of neighboring left and upper blocks. The interpolation is performed in four levels, each level using values from the previous levels for generating the predictor. The difference between the actual value and the predictor of each pixel is encoded using a fixed code with a predetermined number of bits according to the level of the pixel and the image complexity of the block. ARIDPCM is a lossy compression method and is not suitable for environments in which high quality images are required. ARIDPCM is a simple compression method but does not achieve high compression ratios.

Other image compression methods are described in U.S. Pat. No. 6,654,503 to Sudharsanan et al., U.S. Pat. No. 6,269,193 to Young et al., and U.S. patent publication 2004/0071356 to Sudharsanan et al., the disclosures of all of which are incorporated herein by reference.

SUMMARY OF THE INVENTION

An aspect of some embodiments of the invention relates to an image compression method in which image predictors are calculated for at least some of the encoded pixels based on interpolation of non-adjacent pixels and/or based on pixels located on opposite sides of the encoded pixel, such that the encoded pixel and at least two of the prediction pixels are on a single straight line. The differences between the actual values and the predictors are encoded in a lossless or bounded manner.

In some embodiments of the invention, the encoding is performed in a lossy manner. The compression is performed in a manner which prevents lossy values from propagating throughout the image, decreasing the efficiency of the compression and/or degrading the image quality.

It is noted that the terms non-neighboring and non-adjacent pixels of an encoded pixel refer herein to pixels that do not have a common side or corner with the encoded pixel.

In accordance with some embodiments of the present invention it was determined that using non-adjacent prediction pixels for lossless and/or bounded compression methods allows easier implementation of the compression with parallel hardware, while not substantially degrading the compression quality relative to compression methods using predictors based on neighboring pixels, at least for some image types. In fact, for some test images, a better compression is possibly achieved using non-neighboring interpolation relative to neighboring interpolation.

In some embodiments of the invention, only two prediction pixels are used to determine at least some (e.g., at least 30%, 50% or even 70%) of the predictors. The use of only two prediction pixels for at least some of the encoded pixels, can reduce the complexity of the compression and decompression. In some embodiments of the invention, at least 20%, 30% or even 50% of the pixels of the image are encoded using only two predictor pixels.

In some embodiments of the invention, the differences between the actual values and the predictors are encoded using a number of bits which depends on the specific value of the difference. The encoding of the differences is optionally performed using a Huffman type code (e.g., a Golomb code). Using a varying number of bits to encode the differences allows using fewer bits for frequent difference values and more bits for rare difference values, such that a good compression can be achieved even for a lossless or bounded compression type.

Optionally, after encoding the prediction errors (i.e., the differences between the predictions and the actual values), a run length compression is applied to the encoded prediction errors. Alternatively, any other non-image data compression method is used on the encoded prediction errors.

An aspect of some embodiments of the invention relates to an image compression method in which image predictors are calculated based on interpolation of non-adjacent pixels and the differences between the actual values and the predictors are encoded using a codebook selected responsive to the values of the pixels used in the interpolation.

An aspect of some embodiments of the invention relates to an image compression method in which image predictors are calculated based on interpolation of non-adjacent pixels and the differences between the actual values and the predictors are encoded using a codebook dynamically selected responsive to the location of the pixel within the image or a block of the image. The codebook is selected such that pixels of a same level of interpolation, but different location may use different codebooks.

In some embodiments of the invention, the compression is lossless with the difference between the actual pixel values and the interpolation pixel values being perfectly represented. Alternatively, the difference is represented in a partial manner, so that the compression is lossy. In some embodiments of the invention, the compression is performed for transmission and the difference between the lossy compression and the actual image is transmitted on a channel having a higher error rate than the channel on which a coarse portion comprising the results of the compression is transmitted.

In some embodiments of the invention, the image is compressed by repeatedly selecting a pixel distanced from the already represented pixels of the image by a predetermined or dynamically adjusted distance. The selected pixel is encoded and the pixels between the selected pixel and the already represented image portions are recursively encoded as the difference between the actual pixel values and an interpolation of the pixel values.

Optionally, the image is divided into blocks and the recursive interpolation for calculating the predictors is performed from the edges of the block, for example from the lowest right pixel of the block on one hand and the pixels of a neighboring block to the left and above the current block. The blocks optionally have a rectangular shape. In some embodiments of the invention, the blocks include less than 50 pixels or even less than 40 pixels, in order to reduce the memory required for storing a block. Optionally, the blocks have at least one dimension greater than 4 pixels or even greater than 6 pixels. In some embodiments of the invention, the blocks comprise 4×8 pixels.

The encoding of the pixels is thus optionally performed in a mixed order rather than performing the encoding row after row or line after line. This allows generating the predictions based on pixels surrounding the encoded pixel by more than 135°, more than 160° or even more than 180°.

In some embodiments of the invention, the interpolation is performed such that the predictors of at least some of the pixels are calculated based on values of pixels located on opposite sides of the pixel. The use of pixels on opposite sides of the encoded pixel in generating the predictor provides in many images a closer predictor value than a predictor based on neighboring pixels from less than 180° around the pixel. In some embodiments of the invention, for at least some of the encoded pixels, more than two prediction pixels are used, with at least two of the prediction pixels being on a straight line with the encoded pixel.

In some embodiments of the invention, the interpolation is performed such that the predictors of at least some of the pixels are calculated based on pixels on more than two sides of the pixel.

In some embodiments of the invention, at least one of the pixels of each block, referred to herein as an anchor pixel, is encoded using its entire value rather than a predictor value which depends on other pixels and therefore may include errors. Alternatively, anchor pixels may appear in every two, three or even every four blocks. Further alternatively, anchor pixels are not used, for example when lossless compression is performed.

In some embodiments of the invention, at least 0.5% or even at least 1% of the pixels are anchor pixels. Optionally, less than 10% or even less than 5% of the pixels are anchor pixels.

An aspect of some embodiments of the invention relates to an image compression method which encodes prediction errors that separately handles different portions of a compressed image, substantially without dependence of the parameters of the compression (e.g., encoding) in one stream on values of the other stream. In some embodiments of the invention, based on the independence of the compression of different portions of the image, separate hardware units are used to compress and/or decompress the image portions in parallel. Alternatively or additionally, the independence of the compression of the different image portions is used in pipelining the compression. While the separation into portions reduces the efficiency of the compression to a small extent, the advantage in achieving hardware parallelism in some embodiments of the invention, is considered to outweigh the reduction in efficiency.

In some embodiments of the invention, the compressed images are divided into at least 8 portions or even into at least 16 portions. In some embodiments of the invention, the number of portions into which the image is divided is determined according to a pipelining scheme of hardware implementing the compression, such that each stage of the pipelining has a different portion to work on.

The values of pixels in one of the portions are optionally not used in other portions at all. Alternatively, the values of the pixels in some portions affect other portions only through general average values and/or values that are explicitly included in the compressed version of the image. Further alternatively, the values of the pixels of one portion do not affect the parameter values of the compression of other portions. The codebooks used in one of the portions are optionally not affected by the values of the pixels in the other portions.

In some embodiments of the invention, the compressed portions are transmitted separately to a receiver on separate channels or separate time portions of a channel. Thus, delays in one portion do not delay other portions.

An aspect of some embodiments of the invention relates to an image compression unit in which the values to be used in prediction of pixel values are stored in a plurality of memory units in an order selected to allow parallel fetching of the values required for prediction of each pixel value in a single cycle.

There is therefore provided in accordance with an exemplary embodiment of the invention, a method of compressing an image formed of pixels, comprising:

(a) providing a pixel of the image, to be encoded;

(b) selecting at least two pixels of the image, other than the encoded pixel, defining a straight line including the encoded pixel, to serve as prediction pixels;

(c) calculating a prediction value for the encoded pixel using at least the selected pixels;

(d) determining a difference between the calculated prediction value and the actual value of the encoded pixel;

(e) encoding the determined difference, such that the encoding error is bounded; and (f) repeating (a)-(e) for at least 5% of the pixels of the image.

Optionally, selecting the at least two pixels comprises selecting at least three prediction pixels on the straight line, for at least one of the pixels of the image. Optionally, selecting the at least two pixels comprises selecting at least three prediction pixels on the straight line, for at least 5% of the pixels of the image. Optionally, calculating the prediction value comprises calculating using at least one pixel not on the straight line, for at least one of the encoded pixels. Optionally, calculating the prediction value comprises calculating using at least three pixels that surround the encoded pixel by at least 180°. Optionally, calculating the prediction value comprises calculating using at least one pixel not on the straight line, for at least 5% of the encoded pixels. Optionally, calculating the prediction value comprises calculating using only two pixels, for at least 5% of the encoded pixels or even at least 20% of the encoded pixels. Optionally, calculating the prediction value comprises calculating using at least four pixels, for at least 5% of the encoded pixels.

Optionally, calculating the prediction value comprises calculating using at least one pixel not neighboring the encoded pixel, for at least 5% of the encoded pixels. Optionally, calculating the prediction value comprises calculating using at least one pixel not neighboring the encoded pixel, for at least 20% of the encoded pixels. Optionally, encoding the determined difference comprises encoding using a different number of bits for different values.

Optionally, encoding the determined difference comprises encoding using a Huffman type code. Optionally, encoding the determined difference comprises encoding using one of at least five codebooks, managed by a tool performing the compression. Optionally, the image is divided into a plurality of blocks and wherein the codebook used is selected responsive to the position of the encoded pixel within the block. Optionally, the image is divided into a plurality of non-square blocks. Optionally, the image is divided into a plurality of blocks of 4×8 pixels.

Optionally, the image is divided into blocks having no more than 50 pixels.

Optionally, the codebook used is selected responsive to the values of at least one of the pixels used in calculating the prediction value. Optionally, encoding the determined difference comprises encoding using one of at least fifteen managed codebooks. Optionally, encoding the determined difference comprises encoding using a number of codebooks smaller than the number of pixels in each block. Optionally, encoding the determined difference comprises encoding using a number of codebooks larger than the number of pixels in each block.

Optionally, encoding the determined difference comprises encoding using one of at most 50 codebooks, such that all the pixels of the image are encoded using no more than 50 codebooks. Optionally, each of the codebooks is represented by up to two parameter values. Optionally, each of the codebooks is represented by only a single parameter value.

Optionally, each of the codebooks is represented at least by a mean value and a decay value. Optionally, at least one of the codebooks is dynamically adjusted based on the pixels of the image. Optionally, encoding the determined difference comprises encoding losslessly.

Optionally, encoding the determined difference comprises encoding with an error not greater than 5%, for at least 80% of the pixels. Optionally, the method includes encoding at least 1% of the pixels of the image without using predictions. Optionally, the method includes performing run-length coding on the encoded differences. Optionally, the encoding is performed by dedicated hardware.

There is further provided in accordance with an exemplary embodiment of the invention, a method of compressing an image formed of pixels, comprising:

(a) providing a pixel of the image, to be encoded;

(b) selecting at least one pixel of the image, not neighboring the encoded pixel;

(c) calculating a prediction value for the encoded pixel using at least the selected pixel;

(d) determining a difference between the calculated prediction value and the actual value of the encoded pixel;

(e) encoding the determined difference, such that the encoding error is bounded; and (f) repeating (a)-(e) for at least 5% of the pixels of the image or even for at least 80% of the pixels of the image. In some embodiments of the invention, (a)-(e) are repeated for less than all the pixels of the image, optionally less than 98% of the pixels of the image.

There is further provided in accordance with an exemplary embodiment of the invention, a method of compressing an image formed of pixels, comprising:

(a) providing a pixel of the image, to be encoded;

(b) selecting at least three pixels of the image, that surround the encoded pixel by at least 180°;

(c) calculating a prediction value for the encoded pixel using at least the selected pixels;

(d) determining a difference between the calculated prediction value and the actual value of the encoded pixel;

(e) encoding the determined difference, such that the encoding error is bounded; and (f) repeating (a)-(e) for at least 5% of the pixels of the image.

There is further provided in accordance with an exemplary embodiment of the invention, a method of compressing an image formed of pixels, comprising:

(a) providing a pixel of the image, to be encoded;

(b) determining a value representing the pixel;

(c) selecting from at least five different managed codebooks, but at most 100 different codebooks, a codebook for encoding the determined value;

(d) encoding the determined value, using the selected codebook; and (e) repeating (a)-(d) for at least 5% of the pixels of the image.

Optionally, selecting the codebook comprises selecting responsive to a relative location of the pixel within the image.

Optionally, selecting the codebook comprises selecting responsive to a predictor calculated for the encoded pixel.

There is further provided in accordance with an exemplary embodiment of the invention, a method of compressing an image formed of pixels, comprising:

(a) providing a pixel of the image, to be encoded;

(b) selecting at least two pixels of the image, other than the encoded pixel, defining a straight line including the encoded pixel, to serve as prediction pixels;

(c) calculating a prediction value for the encoded pixel using at least the selected pixels;

(d) determining a difference between the calculated prediction value and the actual value of the encoded pixel;

(e) encoding the determined difference, using a codebook selected from a plurality of managed codebooks at least partially responsive to the calculated prediction value; and (f) repeating (a)-(e) for at least 5% of the pixels of the image.

There is further provided in accordance with an exemplary embodiment of the invention, a method of compressing an image formed of pixels, comprising:

(a) providing a pixel of the image, to be encoded;

(b) selecting at least two pixels of the image, other than the encoded pixel, defining a straight line including the encoded pixel, to serve as prediction pixels;

(c) calculating a prediction value for the encoded pixel using at least the selected pixels;

(d) determining a difference between the calculated prediction value and the actual value of the encoded pixel;

(e) encoding the determined difference, using a codebook selected from at least five managed codebooks responsive to the location of the encoded pixel within the image; and (f) repeating (a)-(e) for at least 5% of the pixels of the image.

Optionally, the method includes dividing the image into blocks and wherein the codebook is selected responsive to the location of the encoded pixel within its block.

There is further provided in accordance with an exemplary embodiment of the invention, a method of compressing an image formed of pixels, comprising:

(a) providing a pixel of the image, to be encoded;

(b) selecting at least two pixels of the image, other than the encoded pixel, defining a straight line including the encoded pixel, to serve as prediction pixels;

(c) calculating a prediction value for the encoded pixel using at least the selected pixels;

(d) determining a difference between the calculated prediction value and the actual value of the encoded pixel;

(e) encoding the determined difference, using a codebook which assigns different numbers of bits to different values; and (f) repeating (a)-(e) for at least 5% of the pixels of the image.

There is further provided in accordance with an exemplary embodiment of the invention, a method of compressing an image formed of pixels, comprising:

(a) providing a pixel of the image, to be encoded;

(b) selecting at least two pixels of the image, other than the encoded pixel, defining a straight line including the encoded pixel, to serve as prediction pixels;

(c) calculating a prediction value for the encoded pixel using at least the selected pixels;

(d) determining a difference between the calculated prediction value and the actual value of the encoded pixel;

(e) encoding the determined difference, using a codebook which changes adaptively according to other pixels of the image; and (f) repeating (a)-(e) for at least 5% of the pixels of the image.

There is further provided in accordance with an exemplary embodiment of the invention, a method of compressing an image, comprising:

encoding values for a plurality of pixels in a vicinity of a block in the image;

interpolating expected values for one or more additional pixels in the block, based on the values of the encoded plurality of pixels; and encoding a difference between actual values of the pixels and the expected values of the pixels.

Optionally, encoding the difference comprises encoding using a context selected responsive to a location of the pixel in the block.

Optionally, encoding the difference comprises encoding using a context selected responsive to the expected value of the block.

Optionally, plurality of pixels are non-adjacent.

Optionally, the block is not square, for example including 4×8 pixels.

There is further provided in accordance with an exemplary embodiment of the invention, an image encoder comprising:

means for encoding values for a plurality of pixels in a vicinity of a block in the image;

means for interpolating expected values for one or more additional pixels in the block, based on the values of the encoded plurality of pixels; and means for encoding a difference between actual values of the pixels and the expected values of the pixels.

Optionally, said means for encoding a difference are further configured for performing the encoding using a context selected responsive to a location of the pixel in the block.

Optionally, said means for encoding the difference are further configured for the performing of the encoding using a context selected responsive to the expected value of the block.

Optionally, said image encoder comprises a monolithic semiconductor device. Optionally, said image encoder is configured to handle in parallel a plurality of streams of blocks. Optionally, said streams of blocks are of an even number.

There is further provided in accordance with an exemplary embodiment of the invention, an image decoder comprising means for decoding at least a block decoded using encoding values for a plurality of pixels in a vicinity of a block in the image, interpolating expected values for one or more additional pixels in the block, based on the values of the encoded plurality of pixels and encoding a difference between actual values of the pixels and the expected values of the pixels.

Optionally, said image decoder comprises a monolithic semiconductor device.

BRIEF DESCRIPTION OF FIGURES

Particular non-limiting embodiments of the invention will be described with reference to the following description of embodiments in conjunction with the figures, in which:

FIG. 3 is a schematic illustration of a block division of an image, in accordance with an exemplary embodiment of the invention;

DETAILED DESCRIPTION OF EMBODIMENTS

Figure 1:
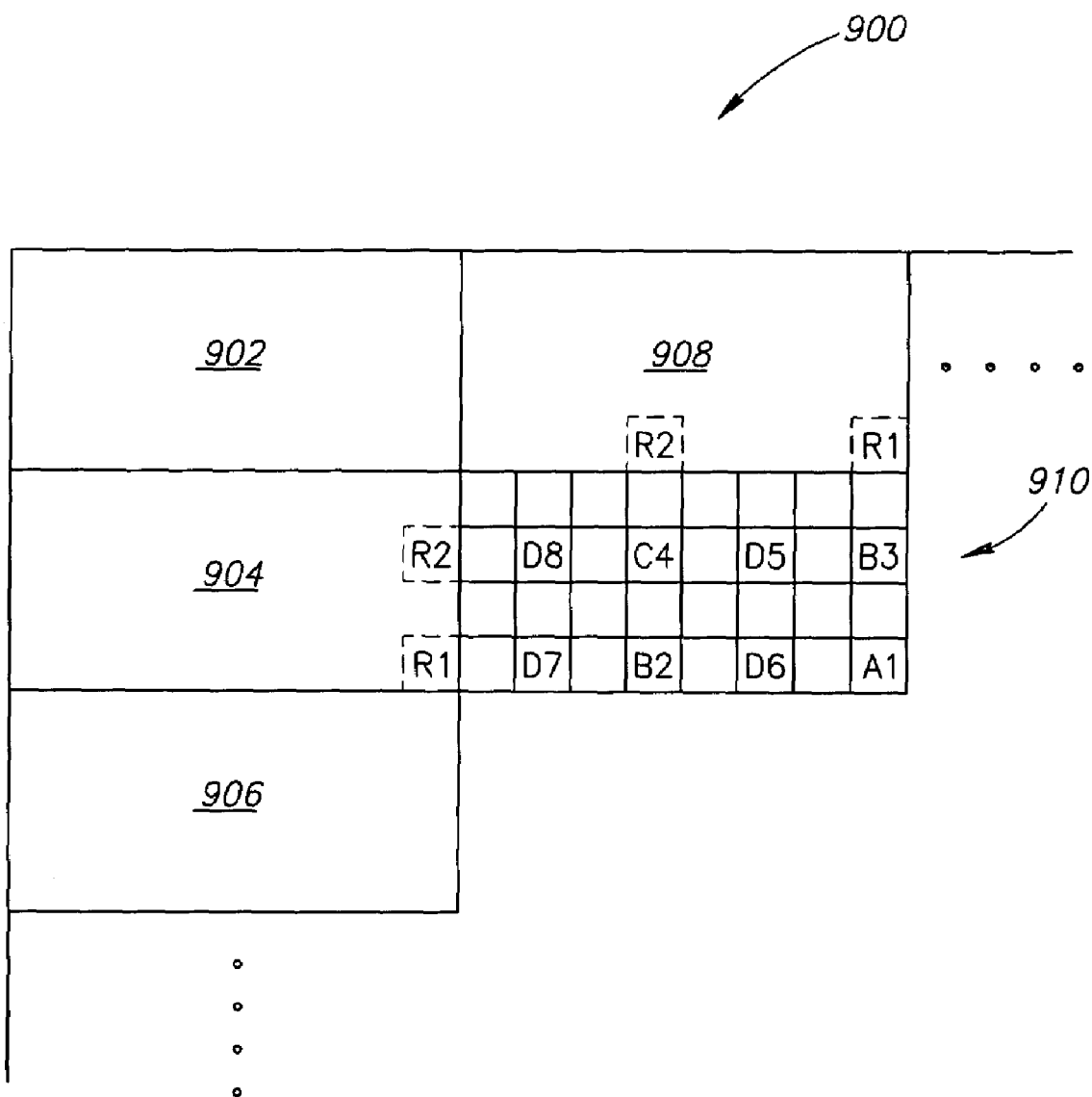
FIG. 1 is a schematic illustration of an order of compression of pixels of an image, in accordance with an exemplary embodiment of the invention.
Figure 2:
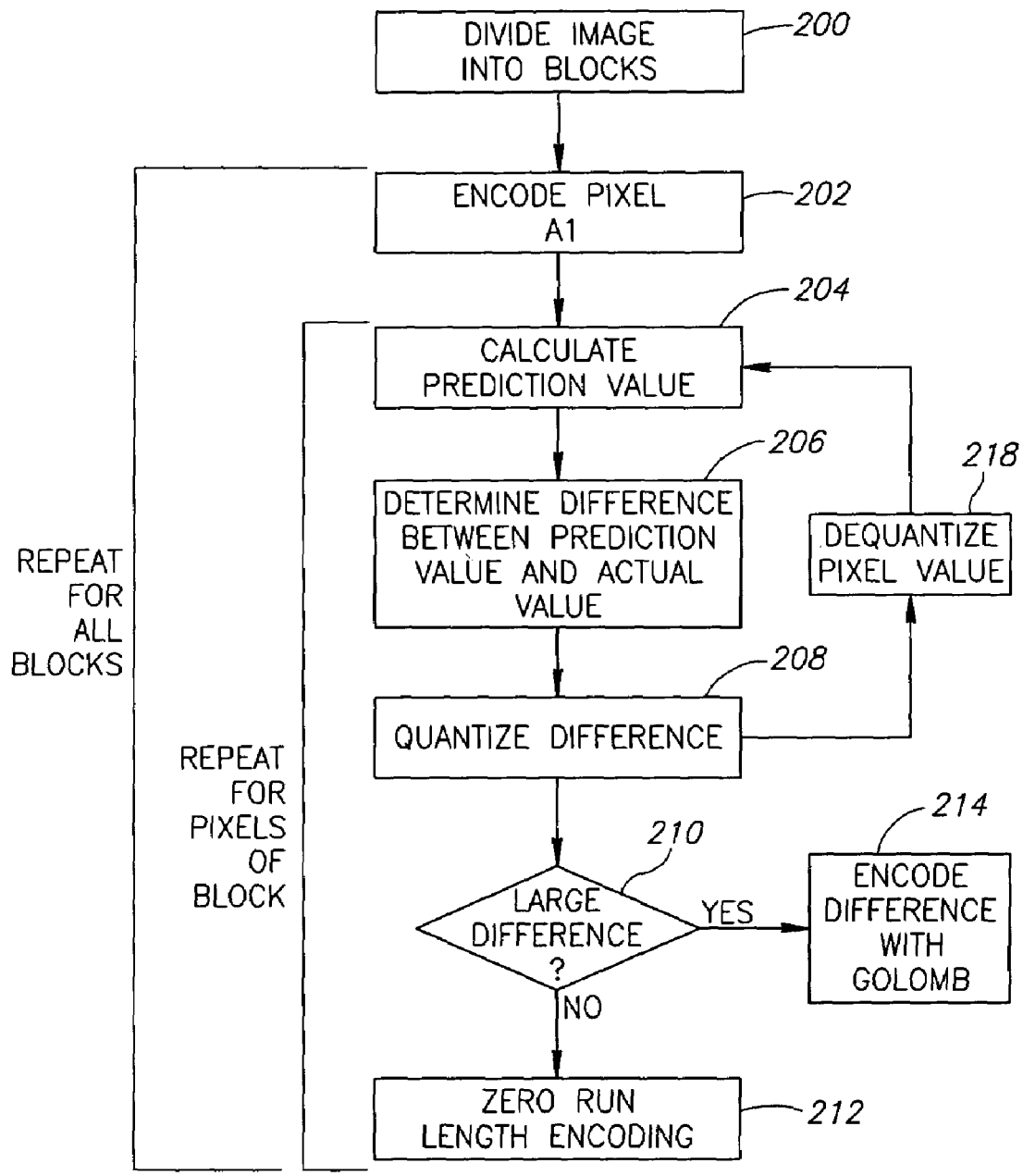
FIG. 2 is a flowchart of acts performed in compressing an image, in accordance with an exemplary embodiment of the invention.

FIG. 1 is a schematic illustration of an order of compression of pixels of an image 900, in accordance with an exemplary embodiment of the invention. FIG. 2 is a flowchart of acts performed in compressing an image, in accordance with an exemplary embodiment of the invention.

The image is divided (200) into a plurality of equal size blocks (e.g., 4×8 pixel blocks). In FIG. 1, for simplicity, only blocks 902, 904, 906, 908 and 910 are shown. The left end and/or top edge blocks (e.g., 902, 904, 906 and 908) are encoded using any method known in the art. In an exemplary embodiment of the invention, the left end and top edge blocks are encoded using the method used for the other blocks using a virtual frame of the image in calculating the prediction values. The virtual frame is optionally given zero values, same values as their neighboring pixels or any other values used in the art for virtual values.

For each non-edge block (e.g., block 910), the lowest right pixel (marked as A1) of the block 910 is encoded (202) in a first stage. Thereafter, prediction values are calculated (204) recursively for the other pixels of the block, using previously handled pixels of the block and optionally values of previously encoded blocks.

The difference between the actual value of the pixel and the prediction value for the pixel is optionally determined (206). In some embodiments of the invention, in which a lossy compression is performed, the difference is quantized (208). If (210) the quantized difference is relatively small, the value is optionally encoded (212) using zero run length encoding. If (210), however, the quantized difference is relatively large, the quantized difference is optionally encoded (214) on its own.

Order of Handling Pixels in Block

In an exemplary embodiment of the invention, in a second stage after encoding pixel A1, pixel B2, in the middle between pixel A1 and a lowest most right pixel R1 of the block 904 to the left of the current block 910, is determined based on the values of pixels A1 and R1. Similarly, a prediction value for pixel B3 in the middle between pixel A1 and pixel R1 of block 908 are calculated, based on the values of pixels A1 and R1 of block 908. In a third stage, a prediction value for pixel C4 is calculated based on two or more of pixels B2, B3 and pixels R2 of blocks 904 and 908. In an exemplary embodiment of the invention, the prediction for pixel C4 is generated based on pixel R2 of block 908 and pixel B2. In a fourth stage, prediction values are calculated for pixels D5, D6, D7 and D8, surrounded by previously handled pixels, based on the already handled pixels of the current block and possibly values of the blocks 904 and 908.

In a fifth stage, prediction values for the remaining pixels of block 910 are calculated. Optionally, in the fifth stage, the predictions of pixels located above previously handled pixels are handled based on the pixels immediately above and below them. Predictions of pixels to the left of previously handled pixels are optionally calculated based on the pixels on their immediate right and left. Predictions for other pixels are optionally calculated based on the four pixels in the four corners of the pixel. Alternatively, other schemes may be used for the predictions, for example using two or more pixels in a same direction and/or using three or five pixels or even more for some of the pixels. For example, the pixel between B2 and D6 may be encoded based on four or more pixels on a straight line connecting pixels A1 and B2, for example based on the pixels A1, D6, B2, D7 and R1 of block 904.

The above stages are optionally repeated for all the non-edge blocks of the image. The blocks are optionally handled in an order such that each block is encoded after the block above it and the block to its left were already encoded. If the blocks are encoded in a different direction, for example from right to left, the order of the encoding of the pixels in the blocks is selected such that each pixel is handled based on previously handled pixels.

Predictions

In some embodiments of the invention, the prediction pixels used for calculating the predictions of at least some of the encoded pixels are prediction pixels on opposite sides of the encoded pixel, e.g., pixels to the left and to the right and/or pixels above and below the encoded pixel. In some embodiments of the invention, the prediction pixels are on opposite corners of the encoded pixel, such that they are neither on the same row or column with each other. Thus, the predictions of at least some of the encoded pixels are generated based on two surrounding pixels defining a straight line on which the current pixel is located. In some embodiments of the invention, at least 50% or even at least 80% of the pixels of the image are encoded using predictor pixels on opposite sides of the encoded pixel, at 180° to each other.

Prediction values for at least some of the encoded pixels are optionally generated using more than three prediction pixels. In some embodiments of the invention, at least 10% or even at least 20% of the pixels of the image are encoded using four or more prediction pixels in generating their prediction value.

In some embodiments of the invention, different numbers of prediction pixels are used for different pixels of the image. Optionally, predictors for at least 20% or even at least 30% of the encoded pixels are generated using only two pixels, while predictors for another at least 20% or even 30% of the pixels are generated using four or more predictor pixels. Optionally, the prediction pixels used for each pixel location in the block are set according to a predetermined scheme. Alternatively, the pixels used may depend on the complexity of the image in the block and/or on the values of potential pixels used for the prediction.

In some embodiments of the invention, predictors of at least 10% or even at least 20% of the pixels of the image are calculated using non-neighboring prediction pixels.

Alternatively to encoding the lowest right pixel A1 of each block without using a predictor, the lowest right pixel A1 is predicted based on pixels of previously encoded blocks, such as the lowest right pixel R1 of the above block 908 and the block 904 to the left.

In some embodiments of the invention, the prediction for each pixel is performed by calculating an average of the pixels used for the prediction, for example using an interpolation procedure. Alternatively, the prediction for each pixel is performed using a weighted average in which each pixel is given a weight according to its proximity to the pixel for which the predictor is generated. Alternatively or additionally, the weights depend on the values of the pixels used in the prediction. In some embodiments of the invention, the weights of the interpolation depend on the complexity of the image in the block and/or based on the average values of the prediction pixels. In some embodiments of the invention, the prediction uses bi-linear, spline and/or any other suitable interpolation method.

While in the above description the prediction pixels are located symmetrically around the predicted pixel, in other embodiments of the invention, the prediction pixels are not organized symmetrically around the predicted pixel. For example, a prediction pixel on the right may be closer or farther than a prediction pixel on the left. Alternatively or additionally, prediction pixels on the right, left and bottom may be used, without using an upper prediction pixel or using a corner upper prediction pixel.

Encoding

In an exemplary embodiment of the invention, the encoding (214) of the prediction errors is performed in a manner similar to that used in the LOCO-I compression method, optionally using Golomb coding.

In some embodiments of the invention, the encoding of the prediction errors is performed using a codebook which uses fewer bits to represent errors that occur frequently and more bits for errors that occur seldom. Optionally, different codebooks are used for different contexts which differ in error values and/or locations within the image. The codebooks are optionally represented by one or more parameters, such as by mean and decay values. In some embodiments of the invention, the codebooks are represented only by the decay value and a zero average is assumed, as the mean value is usually zero. In accordance with these options, only a small amount of storage is required for each codebook. Alternatively, each codebook is represented by a table which lists the encoding value representing each difference value between the prediction and the actual value of the pixel.

Optionally, the codebook of each context is predetermined based on tests performed in configuration of the compression method on a variety of images. Alternatively or additionally, the codebooks of at least some of the contexts are dynamically adjusted based on the prediction errors of the locations in previously encoded blocks of the same image. In an exemplary embodiment of the invention, the dynamic adjustment of the codebooks is performed using the method used in the LOCO-I compression method.

Contexts

The codebook used for a specific error is optionally determined based on the location of the pixel within the block and/or the values of the pixels used as predictors.

In some embodiments of the invention, one or more separate codebooks are managed for each of the pixel locations in the block. Alternatively, the blocks are divided into location types, and the pixels belonging to each location type have the same one or more codebooks. Optionally, different location types are defined for pixels that use different groups of prediction pixels (e.g., different numbers of prediction pixels and/or different relative locations (up and down, left and right)). In some embodiments of the invention, at least five or even at least eight location types are defined.

In some embodiments of the invention, each location type has up to eight or even only up to five different codebooks, which differ in the values of the prediction pixels. Optionally, one or more of the location types has only a single codebook. For example, for a specific location type, three different contexts may be defined with respective codebooks; a first codebook for encoded pixels whose predictor pixels have an average value beneath 90, a second codebook for an average between 91-170 and a third codebook for average values above 171. Optionally, all location types have the same number of codebooks for different values of prediction pixels. Alternatively, different location types have different numbers of codebooks according to compression results of test images. It is noted that the use of location types in defining contexts of codebooks, reduces the total number of codebooks required in order to achieve a sufficient compression quality, relative to defining contexts only based on predictor values. Thus, in some embodiments of the invention, fewer than 100 codebooks or even fewer than 50 codebooks are managed. In an exemplary embodiment of the invention, fewer than 40 codebooks are defined. Optionally, at least 10, 20 or even at least 30 codebooks are defined.

Run Length Encoding

Referring in more detail to determining whether (210) the difference is large or small, in some embodiments of the invention in which the compression is lossy, a predetermined fixed threshold is used. If the difference is smaller than the predetermined threshold, e.g., between [−3,3], the value is assumed to be zero and is included in the run length encoding (212). Alternatively, the threshold is adjusted dynamically according to a maximal difference between the pixels used in the prediction. If there is a large difference between the values of the surrounding pixels used in the prediction, a low threshold (e.g., 1-2) is used, optionally even a zero threshold, as the image in the area of the pixel varies greatly and information should not be lost. On the other hand, if the prediction pixels have similar or same values, a relatively high threshold (e.g., between 4-6) is used. Further alternatively or additionally, the threshold is adjusted according to image history. For example, if in previous blocks many errors were rounded to zero, in further blocks a lower threshold is used. In some embodiments of the invention, each block is allowed a maximal amount of accumulated data loss due to rounding to zero. The threshold is optionally adjusted according to the advancement of the data loss toward the maximum. Alternatively or additionally, a minimal accumulated data loss is defined for each block and the threshold is raised up to a maximal reasonable threshold in case the accumulated data loss is very low. It is noted, however, that if the predictions are very accurate, the accumulated data loss is optionally allowed to be lower than the minimum.

Further alternatively or additionally, the threshold is adjusted according to the location of the block in the image, allowing different loss levels in different areas of the image.

In some embodiments of the invention, different thresholds are used when one or more immediately previous pixels had zero values (or rounded to zero values) and when the immediately previous pixel has a non-zero value. Optionally, a lower threshold, requiring a zero value or a value very close to zero is required in order to start a run of zeros, while a pixel value must exceed a higher threshold value in order to exit a run of zeros. In some embodiments of the invention, the difference value of one or more pixels following the currently encoded pixel are taken into consideration in determining whether to round the current pixel to zero.

In some embodiments of the invention, the threshold is adjusted according to the stage of the prediction of the pixel, allowing lower data loss or no data loss in early stages that affect many other pixels.

Lossless Compression

In the above description, the compression is lossy and small error values are encoded as zero. In other embodiments of the invention, the difference between the actual value and the prediction is encoded in its entirety to achieve a lossless compression. Optionally, in accordance with these embodiments, the run-length coding is applied to streams of zeros only. Alternatively or additionally, the run-length coding is applied to runs of low error values, for example values between [−3,+3]. The encoded differences are generally expected to have similar values and therefore run length coding is expected to achieve substantial data compression.

Block Size

Referring in detail to the sizes of the blocks, in some embodiments of the invention, the blocks are smaller than 50 pixels or even smaller than 40 pixels, so as to minimize the memory space requirements of the compression. Optionally, the pixels have a larger horizontal dimension than vertical dimension, in embodiments in which the compression is performed for each complete column before moving to the next column, so that the separation between columns is relatively large. A larger separation between columns achieves a shorter delay, when the image is received line after line.

Alternatively, the sizes and/or shapes of the blocks are adjusted according to the size and shape of the original image. For example, the blocks may be blocks of 4×8 pixels, but the selection of whether the large dimension is horizontal or vertical is determined responsive to the orientation of the compressed image. Alternatively or additionally, one or more parameters of the compression are selected according to the general content of the image (still image, video sequence, documentary, cartoon) and/or one or more characteristics of the image (black and white or color, color variance, average color).

Other exemplary block sizes which may be used, include 6×12 and 8×8. Blocks having other block sizes may be used in accordance with the present invention. Although the blocks were described above as having dimensions which are powers of two, this is not necessary and some embodiments of the present invention use blocks with heights and/or lengths of, for example, odd numbers of pixels.

Prediction Values in Lossy Compression

In some embodiments of the invention, when a lossy compression is used, the pixel values used in the prediction are the values that a decoder achieves after decompression, i.e., the values after the quantization (208). The difference values are optionally de-quantized and added back to the value of the pixel to achieve a de-quantized pixel value (218). The de-quantized pixel values are used in the prediction of values of further stages.

Optionally, the quantization and de-quantization include dividing by a loss factor and then multiplying by the same loss factor. Optionally, a loss factor which is a power of 2 is used, for simplicity of implementation. Alternatively, an odd loss factor (e.g., 7) is used, to enhance convergence, as is known in the art.

Implementation

In some embodiments of the invention, the video encoding is implemented in hardware using VLSI, ULSI, ASIC, FPGA and/or any other suitable hardware configuration. Optionally, each round of calculations is performed in a single clock cycle per pixel. Alternatively or additionally, at least some of the rounds of calculations require several clock cycles per pixel.

In other embodiments of the invention, the compression is implemented in software or firmware, by a single process or by a plurality of processes performed on a single processor or a plurality of processors. In still other embodiments of the invention, the compression is implemented by a combination of software and hardware.

Compression Order

FIG. 3 is a schematic illustration of a block division of an image 300, in accordance with an exemplary embodiment of the invention. For simplicity, an image with 12×12 blocks is shown, but the principles discussed below may be used with substantially any size of image.

In some embodiments of the invention, the compression is performed sequentially along rows of blocks of the image. Relating to the block division of FIG. 3, the compression optionally handles block A1 and then blocks B1, C1, D1, E1, F1, G1, H1, etc., until the end of line 1. Thereafter, the blocks of line 2, line 3, etc., are compressed until the end of the image.

Optionally, the dynamic adjustment of the codebooks proceeds from block A1 with the order of compression until the last block is compressed. In some embodiments of the invention, it is not possible to compress a block before compressing all the blocks before it in the compression order, or at least reviewing each of the blocks and determining their affect on the codebooks. These embodiments achieve a better compression on most images, because of the similarity of values in most sub-regions of images.

Alternatively to compressing the blocks row after row, the blocks are compressed in another order, such as column after column, starting from blocks A1, A2, A3, proceeding to blocks B1, B2, B3, etc., after all the blocks of column A. The compression continues column after column until the end of the image. Further alternatively, the blocks may be compressed in other orders, for example traversing the columns from the bottom of the image up and/or traversing the rows from right to left. For example, the compression may start with the lowest block in column A, e.g. A12, A11, A10, . . . , and then follows with B12, B11, B10, until all the columns are compressed. In some embodiments of the invention, the compression is performed in a snake order, for example, L1, K1, J1, . . . , A1, A2, B2, C2, . . . , L2, L3, K3, J3, etc. In accordance with these embodiments, those blocks being compressed from right to left, use prediction pixels in a mirror arrangement relative to that described above for prediction from left to right.

Parallel Operation

In the above embodiments, the image is described as being compressed block after block in a single stream of blocks, the compression of each block depending on results of the compression of the previous block in the stream. Alternatively to traversing the entire image in a single stream, the image is divided into a plurality of portions included in separate streams. This allows parallel compression and/or decompression. The parallel nature of these implementations allows for high bandwidth performance required for high quality video streams that may require in excess of 100 megabits per second. Alternatively or additionally, slower hardware is used in parallel to achieve a required processing rate of images.

In an exemplary embodiment of the invention, rows A, B, C and D are included in a first stream, rows E-H are included in a second stream, etc. In other embodiments of the invention, the columns included in a single stream are separated from each other by the number of streams used. For example, if four streams are used, columns A, E and I are included in a first stream, columns B, F and J are included in a second stream, etc. In an exemplary embodiment of the invention, 8 or 16 streams are used. Alternatively to dividing different columns into different streams, different rows of the image are divided into different streams.

In some embodiments of the invention, in the encoding stage, the encoding history of each stream is determined separately without data from other streams. Optionally, each stream uses a separate set of dynamically adjusted codebooks and the pixels of each stream do not affect the pixels of the other streams. Thus, the encoding of the data of different streams can be performed independently. For example, the stream history is optionally used in determining a decay (K) parameter of contexts. As another example, in some embodiments of the invention, a threshold of small values to be considered zero in run length encoding is adjusted separately in each stream.

In some embodiments of the invention, when the compression of one stream requires values from another stream, virtual values are used, for example using predetermined values or duplicates of neighboring pixel values. Alternatively, the streams use prediction values from other streams, when they are required.

Performing the encoding for each stream separately, optionally allows performing the encoding in parallel for all streams. It is noted, however, that in some cases it may be desired to perform the processing for some of the streams sequentially or only partially in parallel, for example due to dependence in the prediction stage when virtual values are not used.

Figure 4:
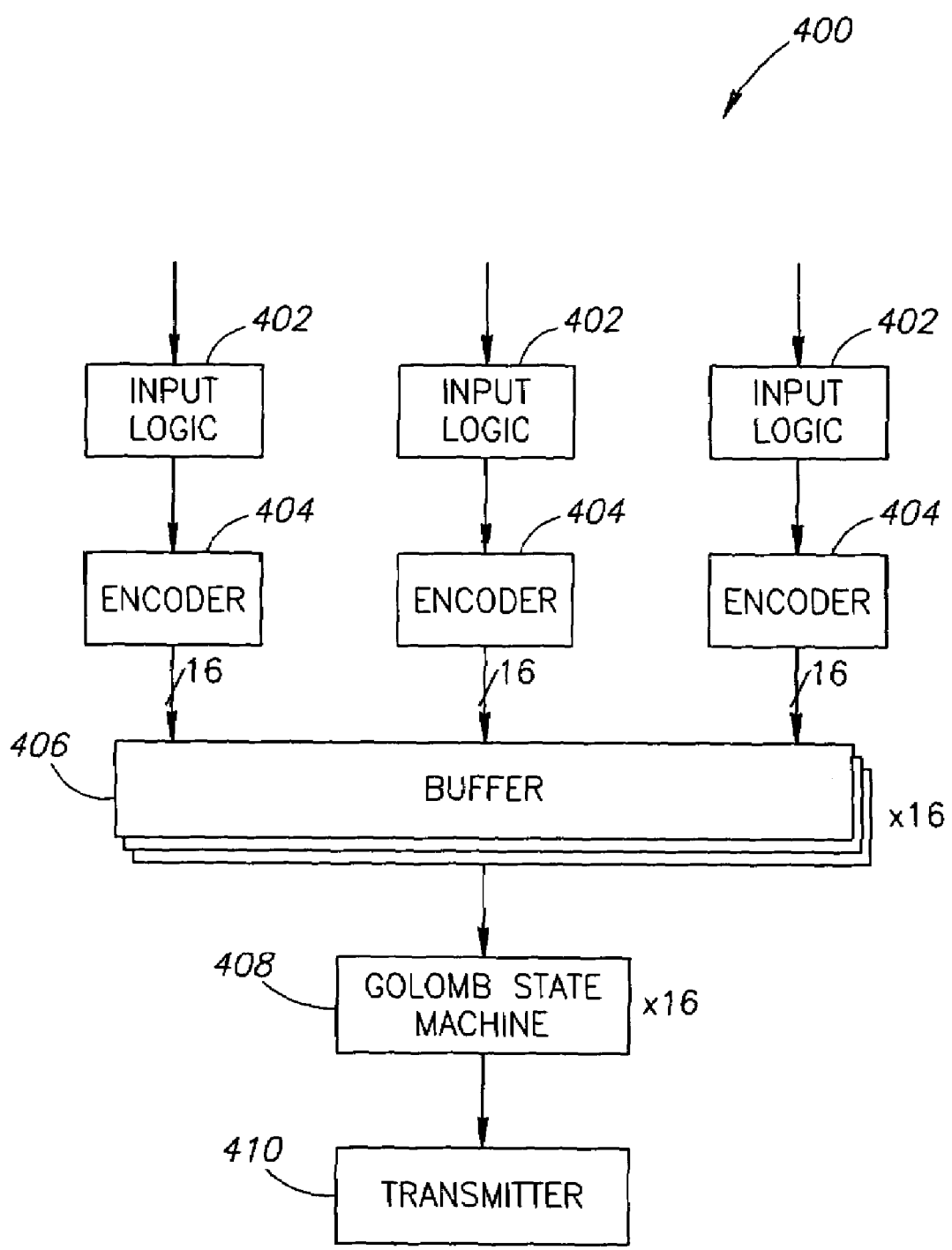
FIG. 4 is a schematic block diagram of an image encoder, in accordance with an exemplary embodiment of the invention.

FIG. 4 is a schematic block diagram of an image compression unit 400, in accordance with an exemplary embodiment of the invention. Compression unit 400 optionally comprises three input logic units 402 which each receives image information of a different color component. For each color component, compression unit 400 optionally includes a respective encoder 404, which generates difference values for a predetermined number of streams, e.g., 16 streams. The difference values of each of the streams is provided to a separate buffer 406 in which the results of each block or group of blocks are stored while awaiting further processing. A Golomb state machine 408, for each stream, optionally retrieves the values from the buffer and performs Golomb encoding on the difference values. The results of the Golomb encoding are optionally transmitted by a transmitter 410. Alternatively, the results are stored or are handled in any other way.

Figure 5:
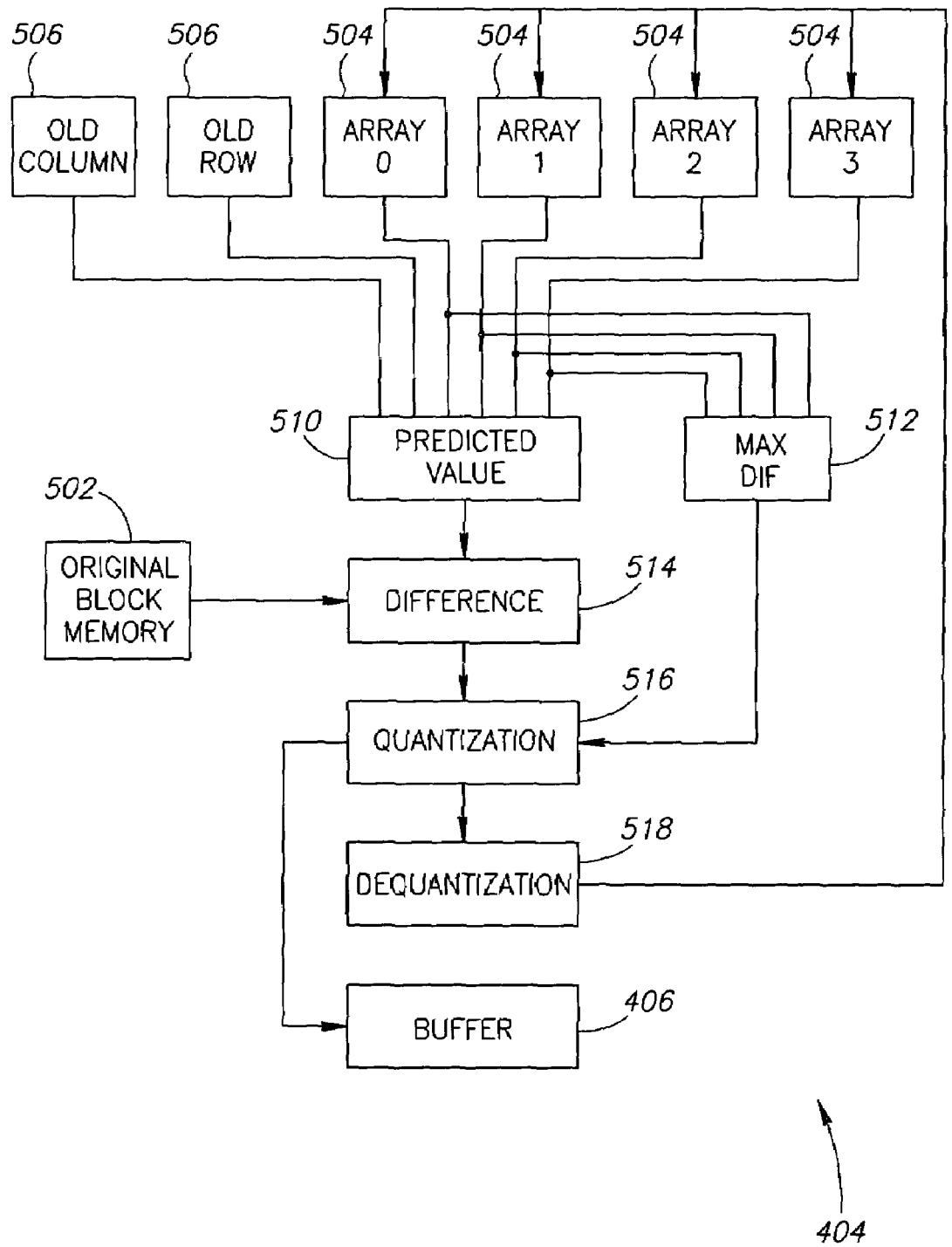
FIG. 5 is a schematic block diagram of an encoder, in accordance with an exemplary embodiment of the invention.

FIG. 5 is a schematic block diagram of encoder 404, in accordance with an exemplary embodiment of the invention. Encoder 404 optionally includes a single memory 502 for storage of the pixels of the block (e.g., 910) being handled and a plurality of arrays 504 (e.g., four) for storing the values of the pixels used in generating the prediction values. In some embodiments of the invention, separate memory units 506 are used for storing values of other blocks used in the prediction. Alternatively, arrays 504 store also the values of other blocks used in the prediction for the current block. By storing the prediction values in a plurality of different arrays 504, the values are easily retrieved for use within a single clock cycle. Optionally, the prediction values are arranged in arrays 504 in an arrangement such that for substantially all the pixels the prediction values for the pixels are in different arrays 504. In some embodiments of the invention, one or more of the values used in the prediction are stored in duplicate in a plurality of arrays 504, in order to allow fetching of the value together with pixels in different arrays 504. The de-quantized values are optionally returned for storage to arrays 504, since the prediction is performed, in some embodiments of the invention, based on the de-quantized values.

A predicted value unit 510 optionally determines the predicted value, while a max-dif unit 512 determines the maximal difference between the values of the pixels used in the prediction for determination of the threshold in zero run encoding. A difference unit 514 optionally determines the difference between the prediction value and the original value in block memory 502. A quantization unit 516 optionally determines a quantization of the difference value to represent the pixel. In some embodiments of the invention, quantization unit 516 also performs preparations for the Golomb and/or run encoding, for example determining whether the pixel will be rounded to zero. A de-quantization unit 518 optionally determines the value of the pixel as received by the decoder, for use in prediction of other pixels of the block.

Encoder 404 optionally operates in accordance with a pipelining scheme, such that while predicted value 510 operates on one stream of the image, difference unit 514 operates on a second stream and a quantization unit 516 operates on a third stream. In some embodiments of the invention, each of the units of encoder 404 operates in a single clock cycle. Alternatively, one or more of the units described in FIG. 5 require a plurality of cycles and/or a plurality of the units in FIG. 5 operate in parallel. In an exemplary embodiment of the invention, encoder 404 has 10 pipeline stages. Optionally, the number of streams into which the image is divided is greater than the number of stages in the pipeline, such that all the stages of the pipeline can operate on different streams, without waiting for the results of the same stream from a previous pixel. It is noted, however, that the advantages of the pipelining can be achieved at least partially, even when the number of stages in the pipeline is smaller than the number of streams.

Alternatively or additionally to encoder 404 operating in accordance with a pipelining scheme, encoder 404 includes a plurality of units which operate in parallel on different streams.

It is noted that the present invention is not limited to any type of images and may be used for still images as well as video images of substantially any size. The invention may be used on images of a single color component or of a plurality of color components. In some embodiments of the invention, when the image is a color image, each color component (e.g., Y,Cr,Cb) is handled separately from the other color components. The compressed images may be used for substantially any purpose including high quality television and/or video, medical imaging and/or satellite images.

The method of FIG. 2 may be used for substantially any application that requires image compression. In some embodiments of the invention, the compression method of FIG. 2 is used for transmission between a transmitter and a receiver. In other embodiments of the invention, the method of FIG. 2 is used for storage of images. In an exemplary embodiment of the invention, when the compression is performed for transmission and a plurality of streams are compressed independently, each compressed stream is optionally transmitted separately in order to prevent a larger stream from delaying other streams due to a low compression ratio of the stream. In some embodiments of the invention, the transmission of the compressed stream is performed as described in above mentioned PCT publication WO2005/029737.

It is noted that the order of pixel encoding in FIG. 2 and/or the specific pixels encoded in each stage are brought as an example, and many other pixel orders may be used in accordance with the present invention.

While in some cases it is desired to use the same compression method for the entire image for simplicity, in some embodiments of the invention different methods are used for different portions (e.g., streams) of the image, for example, when a lossy compression is used, in order to have different compression distortions affect different portions of the image. In some embodiments of the invention, the different compression methods differ in the block size, the prediction pixels they use, the number of contexts they define and/or any other parameters of the compression.

Although the above description relates to images formed of square pixels, the principals of the invention may be applied to non-square rectangular pixels. Optionally, in such cases, the weights of the prediction pixels are adjusted according to the length of their common side with the encoded pixel, if they have a common side. Furthermore, the principals of some aspects of the invention may be applied to non-rectangular pixels, such as hexagonal pixels. Optionally, in such cases, the sizes and shapes of the blocks are adjusted accordingly.

Exemplary encoders and decoders which may be used in accordance with an embodiment of the invention are described in appendices attached to the above referenced provisional application 60/590,197 and 60/667,366. The disclosures of these appendices are incorporated herein by reference. It is noted that the embodiments described in the appendices are brought by way of example and many other implementations may be used. The hardware units shown in the figures of the appendices may be replaced by alternative units known in the art. It is noted that throughout the appendix documents there are statements that relate to the methods and/or apparatus to be used in the particular embodiment described by the invention. These statements relate to the particular embodiment described by the appendix and do not exclude the possibility of using other embodiments which use other apparatus and/or methods.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. For example, instead of identifying misuse for specific users, the procedures may relate to each terminal as a separate entity and relate to the transactions performed from the terminal together. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of compressing an image, the method comprising:
applying a prediction unit to calculate a prediction value of a pixel to be encoded in a frame of said image, wherein the pixel to be encoded lies on a straight line spatially in between at least two other pixels and the prediction value is at least partially based on the at least two other pixels;
determining a difference between the prediction value and an actual value of the pixel to be encoded;
encoding the difference with a bounded encoding error; and
repeating said calculating, determining and encoding for at least 5% of the pixels of the image.

2. A method according to claim 1 wherein, for at least one of the pixels of the image, the at least two other pixels comprise at least three pixels on the straight line.

3. A method according to claim 2 wherein, for at least 5% of the pixels of the image, the at least three pixels comprise at least three pixels on the straight line.

4. A method according to claim 1, wherein for at least one pixel of the image, calculating the prediction value comprises calculating the predication value using at least one pixel not on the straight line.

5. A method according to claim 1, wherein for at least one pixel of the image, calculating the prediction value comprises calculating the prediction value using at least three pixels that surround the pixel to be encoded by at least 180 degrees.

6. A method according to claim 4, wherein for at least 5% of the pixels of the image, calculating the prediction value comprises calculating the prediction value using at least one pixel, not on the straight line.

7. A method according to claim 1, wherein for at least 5% of the pixels of the image, calculating the prediction value comprises calculating the prediction value using only the two other pixels.

8. A method according to claim 7, wherein for at least 20% of the pixels of the image, calculating the prediction value comprises calculating the prediction value using only the two other pixels.

9. A method according to claim 1, wherein for at least 5% of the pixels of the image, calculating the prediction value comprises calculating the prediction value using at least four pixels.

10. A method according to claim 1, wherein for at least 5% of the pixels of the image, calculating the prediction value comprises calculating the prediction value using at least one pixel not neighboring the encoded pixel.

11. A method according to claim 10, wherein for at least 20% of the pixels of the image, calculating the prediction value comprises calculating the prediction value using at least one pixel not neighboring the encoded pixel.

12. A method according to claim 1, wherein encoding the difference comprises encoding the difference using a number of bits based on the difference.

13. A method according to claim 1, wherein encoding the difference comprises encoding the difference using a Huffman type code.

14. A method according to claim 1, wherein encoding the difference comprises selecting a codebook from at least five codebooks and encoding the difference using the selected codebook.

15. A method according to claim 14, wherein the image is divided into a plurality of blocks, and wherein selecting the codebook comprises selecting the codebook based on a position of the pixel to be encoded within a block of said plurality of blocks.

16. A method according to claim 15, wherein said plurality of blocks comprises a plurality of non-square blocks.

17. A method according to claim 15, wherein said plurality of blocks comprises a plurality of blocks of 4×8 pixels.

18. A method according to claim 15, wherein said plurality of blocks comprises one or more blocks having no more than 50 pixels.

19. A method according to claim 14, wherein selecting the codebook comprises selecting the codebook based on at least one value of at least one of the pixels used in calculating the prediction value.

20. A method according to claim 14, wherein the at least five codebooks comprise at least fifteen managed codebooks.

21. A method according to claim 1 comprising recursively repeating said calculating, determining and encoding for one or more other pixels of said frame lying on said straight line between the at least two other pixels.

22. A method according to claim 21, wherein the pixel to be encoded comprises a first pixel lying on said straight line between said at least two other pixels, the method comprising:
calculating a prediction value of a second pixel lying on said straight line between said first pixel and a pixel of said two other pixels based at least on the actual value of said first pixel and the value of the pixel of said two other pixels;

determining a difference between the prediction value and an actual value of the second pixel to be encoded; and encoding the difference with a bounded encoding error.

23. A method according to claim 1, wherein said image is divided into a plurality of blocks, wherein said pixel to be encoded comprises a pixel of a block of said plurality of blocks, and wherein said at least two other pixels comprise an edge pixel of said block.

24. A method according to claim 23 comprising recursively repeating said calculating, determining and encoding for one or more other pixels of said block lying on said straight line between the at least two other pixels.

25. An image frame encoder comprising:

circuitry adapted to calculate a prediction value of a pixel to be encoded in a frame of said image, wherein the pixel to be encoded lies on a straight line spatially in between at least two other pixels and the prediction value is at least partially based on the at least two other pixels;

said circuitry further adapted to: (1) determine a difference between the prediction value and an actual value of the pixel to be encoded; (2) encode the difference with a bounded encoding error; and (3) repeat said calculating, determining and encoding for at least 5% of the pixels of the image.

26. An image frame encoder according to claim 25 wherein, for at least one of the pixels of the image, the at least two, other pixels comprise at least three pixels on the straight line.

27. An image frame encoder according to claim 26 wherein, for at least 5% of the pixels of the image, the at least three pixels comprise at least three pixels on the straight line.

28. An image frame encoder according to claim 25, wherein for at least one pixel of the image, calculating the prediction value comprises calculating the predication value using at least one pixel not on the straight line.

29. An image frame encoder according to claim 25, wherein for at least one pixel of the image, calculating the prediction value comprises calculating the prediction value using at least three pixels that surround the pixel to be encoded by at least 180 degrees.

30. An image frame encoder according to claim 28, wherein for at least 5% of the pixels of the image, calculating the prediction value comprises calculating the prediction value using at least one pixel not on the straight line.

31. An image frame encoder according to claim 25, wherein for at least 5% of the pixels of the image, calculating the prediction value comprises calculating the prediction value using only the two other pixels.

32. An image frame encoder according to claim 31, wherein for at least 20% of the pixels of the image, calculating the prediction value comprises calculating the prediction value using only the two other pixels.

33. An image frame encoder according to claim 25, wherein for at least 5% of the pixels of the image, calculating the prediction value comprises calculating the prediction value using at least four pixels.

34. An image frame encoder according to claim 25, wherein for at least 5% of the pixels of the image, calculating the prediction value comprises calculating the prediction value using at least one pixel not neighboring The encoded pixel.

35. An image source device comprising a digital data receiver; and an image frame encoder comprising circuitry adapted to calculate a prediction value of a pixel to be encoded in a frame of said image, wherein the pixel to be encoded lies on a straight line spatially in between at least two other pixels and the prediction value is at least partially based on the at least two other pixels;

said circuitry further adapted to: (1) determine a difference between the prediction value and an actual value of the pixel to be encoded; (2) encode the difference with a bounded encoding error; and (3) repeat said calculating, determining and encoding for at least 5% of the pixels of the image.

36. An image source device according to claim 35 wherein, for at least one of the pixels of the image, the at least two other pixels comprise at least three pixels on the straight line.

37. An image source device according to claim 36 wherein, for at least 5% of the pixels of the image, the at least three pixels comprise at least three pixels on the straight line.

38. An image source device according to claim 35, wherein for at least one pixel of the image, calculating the prediction value comprises calculating the predication value using at least one pixel not on the straight line.

39. An image source device according to claim 35, wherein for at least one pixel of the image, calculating the prediction value comprises calculating the prediction value using at least three pixels that surround the pixel to be encoded by at least 180 degrees.

40. An image source device according to claim 38, wherein for at least 5% of the pixels of the image, calculating the prediction value comprises calculating the prediction value using at least one pixel not on the straight line.

41. An image source device according to claim 35, wherein for at least 5% of the pixels of the image, calculating the prediction value comprises calculating the prediction value using only the two other pixels.

42. An image source device according to claim 41, wherein for at least 20% of the pixels of the image, calculating the prediction value comprises calculating the prediction value using only the two other pixels.

43. An image source device according to claim 35, wherein for at least 5% of the pixels of the image, calculating the prediction value comprises calculating the prediction value using at least four pixels.

44. An image source device according to claim 35, wherein for at least 5% of the pixels of the image, calculating the prediction value comprises calculating the prediction value using at least one pixel not neighboring the encoded pixel.

* * * * *